(12) United States Patent
Kim et al.

(10) Patent No.: US 12,179,683 B2
(45) Date of Patent: Dec. 31, 2024

(54) STEERING WHEEL

(71) Applicant: Autoliv Development AB, Vargarda (SE)

(72) Inventors: Jinkeun Kim, Kanagawa (JP); Syunsuke Kanagami, Kanagawa (JP)

(73) Assignee: Autoliv Development AB, Vargarda (SE)

(*) Notice: Subject to any disclaimer, the term of this patent is extended or adjusted under 35 U.S.C. 154(b) by 0 days.

(21) Appl. No.: 18/550,405

(22) PCT Filed: Jan. 31, 2022

(86) PCT No.: PCT/JP2022/003550
§ 371 (c)(1),
(2) Date: Sep. 13, 2023

(87) PCT Pub. No.: WO2022/196134
PCT Pub. Date: Sep. 22, 2022

(65) Prior Publication Data
US 2024/0149821 A1 May 9, 2024

(30) Foreign Application Priority Data
Mar. 19, 2021 (JP) ................................. 2021-046037

(51) Int. Cl.
 *B60R 21/203* (2006.01)
 *B60Q 5/00* (2006.01)
 (Continued)

(52) U.S. Cl.
CPC .......... *B60R 21/2037* (2013.01); *B60Q 5/003* (2013.01); *B60R 21/21658* (2013.01); *B62D 7/222* (2013.01)

(58) Field of Classification Search
CPC ............. B60R 21/2037; B60R 21/203; B60R 21/21658; B60Q 5/003; B60Q 5/001;
(Continued)

(56) References Cited

U.S. PATENT DOCUMENTS 7,007,969 B2* 3/2006 Abe ....................... B60Q 5/003
 280/728.1
2015/0210239 A1* 7/2015 Sakaguchi .......... B60R 21/2037
 280/728.2

FOREIGN PATENT DOCUMENTS

| JP | 2009-248666 A | 10/2009 |
|---|---|---|
| JP | 2010-69934 A | 4/2010 |

(Continued)

*Primary Examiner* — Keith J Frisby
(74) *Attorney, Agent, or Firm* — Foley & Lardner LLP (57) ABSTRACT

A steering wheel enabling support of an airbag module by distributing a load when the airbag activates to ensure prescribed deployment performance of the airbag without affecting the horn function. The steering wheel includes: a support unit that supports the airbag module enabling the airbag module to move along the Z-axis direction relative to the core metal; and a horn mechanism having a movable contact provided on the airbag module and a fixed contact provided on the pin of the support unit. When in a horn non-operating state, a stopper is separated by a distance D2 in the Z-axis direction relative to the airbag module and the distance D2 is farther than the distance D1 of the movable contact and the fixed contact in the Z-axis direction.

20 Claims, 10 Drawing Sheets

(51) Int. Cl.
*B60R 21/2165* (2011.01)
*B62D 7/22* (2006.01)

(58) Field of Classification Search
CPC . B60Q 5/00; B62D 1/04; B62D 7/222; B62D 7/22; Y10T 74/20834
USPC ................ 280/731, 728.2; 200/61.54, 61.55; 74/552
See application file for complete search history.

(56) References Cited

FOREIGN PATENT DOCUMENTS

| | | | |
|---|---|---|---|
| JP | 2016-28963 A | | 3/2016 |
| JP | 2020128156 A | * | 8/2020 |
| KR | 20070059442 A | * | 6/2007 |
| WO | 2015/125349 A1 | | 8/2015 |

* cited by examiner

STEERING WHEEL

TECHNICAL FIELD

The present invention relates to a steering wheel.

BACKGROUND ART

There are known steering wheels installed in a vehicle equipped with a function as a front airbag for in the event of an emergency and a function as a horn device. For example, in Patent Document 1, a horn block composed of an airbag module and a steering pad is supported on a core metal of a steering wheel by a total of three floating units. The horn block is pushed against the spring of the floating unit, and the movable contact on the horn block side (arranged in the housing in which the airbag is stowed) contacts the fixed contact on the core metal side, sounding the horn (see paragraphs 0021 to 0022 of the same document).

RELATED ART DOCUMENTS

Patent Documents

Patent Document 1: WO 2015/125349

SUMMARY OF THE INVENTION

Problem to be Solved by the Invention

The floating unit described in Patent Document 1 supports the airbag module, even when the airbag is activated. However, when the airbag is activated, the load input from the airbag module to the floating unit is greater than when the horn is activated. Therefore, the spring of the floating unit may be compressed more than a prescribed amount depending on the properties of the airbag, the mode of expansion, and the like. As a result, if the airbag module moves toward the core metal by more than a prescribed amount, or if the housing of the airbag module is deformed, the prescribed deployment performance of the airbag cushion may be impaired.

In view of this manner of problem, an increase in the support of the airbag module from the core metal may be considered. However, simply adding a support structure may cause loss of the horn function.

An object of the present invention is to provide a steering wheel enabling supporting the airbag module by distributing the load when the airbag activates and ensuring a prescribed deployment performance of the airbag cushion without affecting the horn function.

Means to Solve the Problem

The steering wheel according to an aspect of the present invention includes:
- a core metal forming a skeletal structure of the steering wheel;
- an airbag module having a housing in which an airbag cushion is stowed;
- a support unit for supporting the airbag module so as to enable the airbag module to move along a first direction;
- a horn mechanism including a movable contact and a fixed contact; and
- a stopper provided on a second of the core metal and the airbag module so as to enable contact with a first of the core metal and the airbag module. The movable contact is provided on the airbag module and the fixed contact is provided on the core metal or the support unit. The movable contact is separated from the fixed contact by a first distance in a first direction when the horn is in a non-operating state, while to achieve the horn operating state, the airbag module is moved in the first direction and comes into contact with the fixed contact. When in the horn non-operating state, the stopper is separated from the first of the core metal and the airbag module by the second distance in the first direction and the second distance is longer than the first distance.

According to this aspect, in the case where the airbag module moves toward the core metal the second distance in the first direction, exceeding the distance between the contacts (the first distance) when the airbag is activated, this movement is restricted by the stopper. As a result, compared to only supporting the airbag module with the support unit, the support load is distributed when the airbag is activated, enabling providing appropriate support to the airbag module. Therefore, prescribed deployment performance of the airbag cushion can be ensured.

In addition, since the distance relationship in the horn non-operating state is set to the above relationship (second distance>first distance), during the transition from the horn non-operating state to the horn operating state (the airbag module is moved by the first distance during movement in the Z-axis direction), the movement of the airbag module is not restricted by the stopper. Therefore, even though the stopper is provided, it does not affect the horn function.

DESCRIPTION OF THE PREFERRED EMBODIMENTS

A steering wheel according to a preferred embodiment of the present invention will be described.

The steering wheel is arranged on the driver seat side of a vehicle such as an automobile, and has a plurality of functions. For example, the steering wheel functions as a vehicle steering device. Specifically, the steering wheel is generally attached in an inclined state to an upper end section of a steering shaft provided on a vehicle body. Furthermore, steering force from the driver is transmitted from the steering wheel to the steering shaft, and transmitted to wheels via a steering gear or the like, thereby changing the direction of the wheels.

In addition, the steering wheel also functions as a front airbag in the event of a vehicle emergency. An example of a vehicle emergency is a time when a vehicle collision occurs. The steering wheel functioning as a front airbag is mainly achieved by an airbag module installed on the core metal of the steering wheel. In addition to these functions, the steering wheel has a function as a horn device. In addition, the steering wheel may have a function as a dynamic damper for damping vibration from the vehicle to the steering wheel and this function is achieved by using the airbag module as a damper mass.

In the following, for convenience of explanation, the three axes of XYZ are defined as follows. The axial direction of the steering shaft is defined as the "Z-axis direction", or a first direction, the direction connecting 9 o'clock and 3 o'clock on an analog 12-hour clock on a flat surface orthogonal to the Z-axis direction is defined as the "X-axis direction", and the direction connecting 12 o'clock and 6 o'clock on the same clock is defined as the "Y-axis direction". The X-axis direction can be a direction corresponding to the width direction of the steering wheel or vehicle. A plane defined by the X-axis and the Y-axis is called an "XY plane".

Figure 1A:
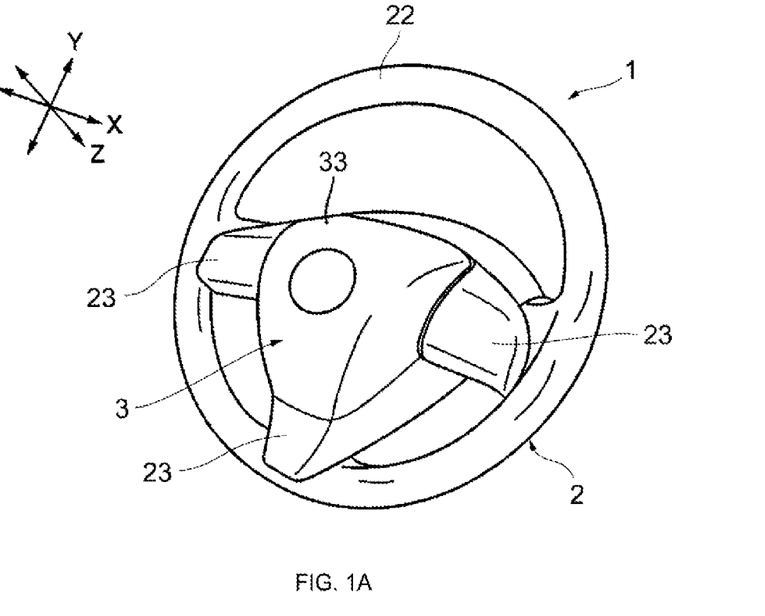
FIG. 1A is a perspective view depicting an appearance of a steering wheel according to the present embodiment in a state of an airbag module being mounted on a core metal.
Figure 1B:
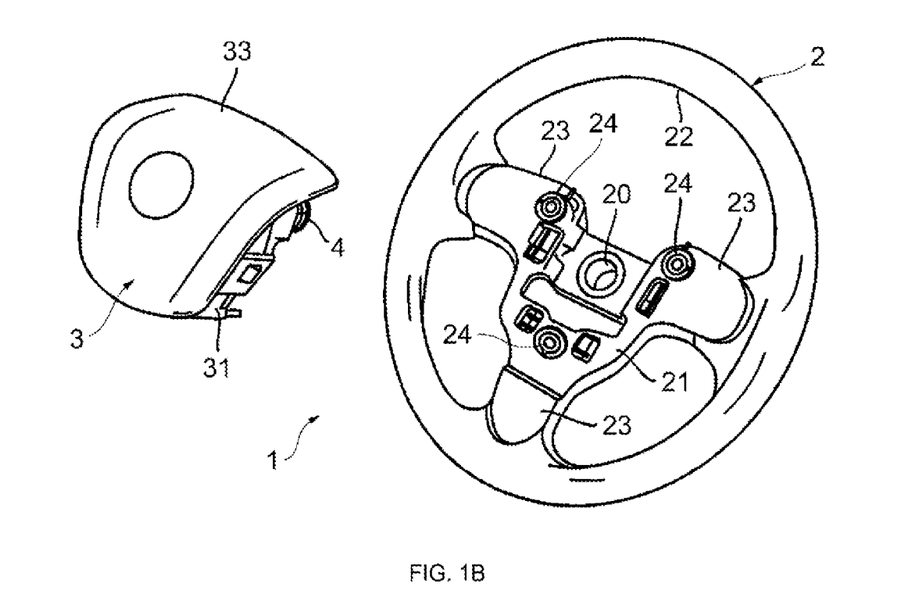
FIG. 1B is a perspective view depicting an appearance of the steering wheel of FIG. 1A in a state of the airbag module having been removed from the core metal.

As depicted in FIG. 1, the steering wheel 1 includes a core metal 2 and an airbag module 3. In addition, the steering wheel 1 has a support unit 4 and the support unit 4 enables the airbag module 3 to move along the Z-axis direction relative to the core metal 2.

The core metal 2 forms the skeleton of the steering wheel 1. The core metal 2 includes a base part 21 having a boss part 20, an annular rim part 22 gripped by the driver, and spoke parts 23 connecting the boss part 20 or the base part 21 and the rim part 22. The boss part 20 is connected to the steering shaft. The base part 21 is a section including the boss part 20 in the center, and has a plurality of (here, three) mounting holes 24, 24, 24 on a peripheral portion of the boss section 20 for mounting the airbag module 3. The mounting holes 24 penetrate the base part 21. There are three spoke parts 23, which extend in three directions from the base part 21 and are connected to the rim part 22 on the outer circumference of the steering wheel 1.

The core metal 2 is composed of, for example, metal such as iron, aluminum, or magnesium, resin, or the like. The core metal 2 is provided with a layer of soft synthetic resin coating such as foamed polyurethane resin so as to partially or wholly cover the core bar. There may be a plurality of layers for this type of layer. For example, a urethane layer as an insulating layer, a heater electrode layer for a heater function to warm the steering wheel 1, a skin layer as an insulating layer, and a sensor electrode for detecting gripping of the steering wheel 1 by the driver, may be sequentially arranged in the direction facing outward from the core metal 2.

Figure 2:
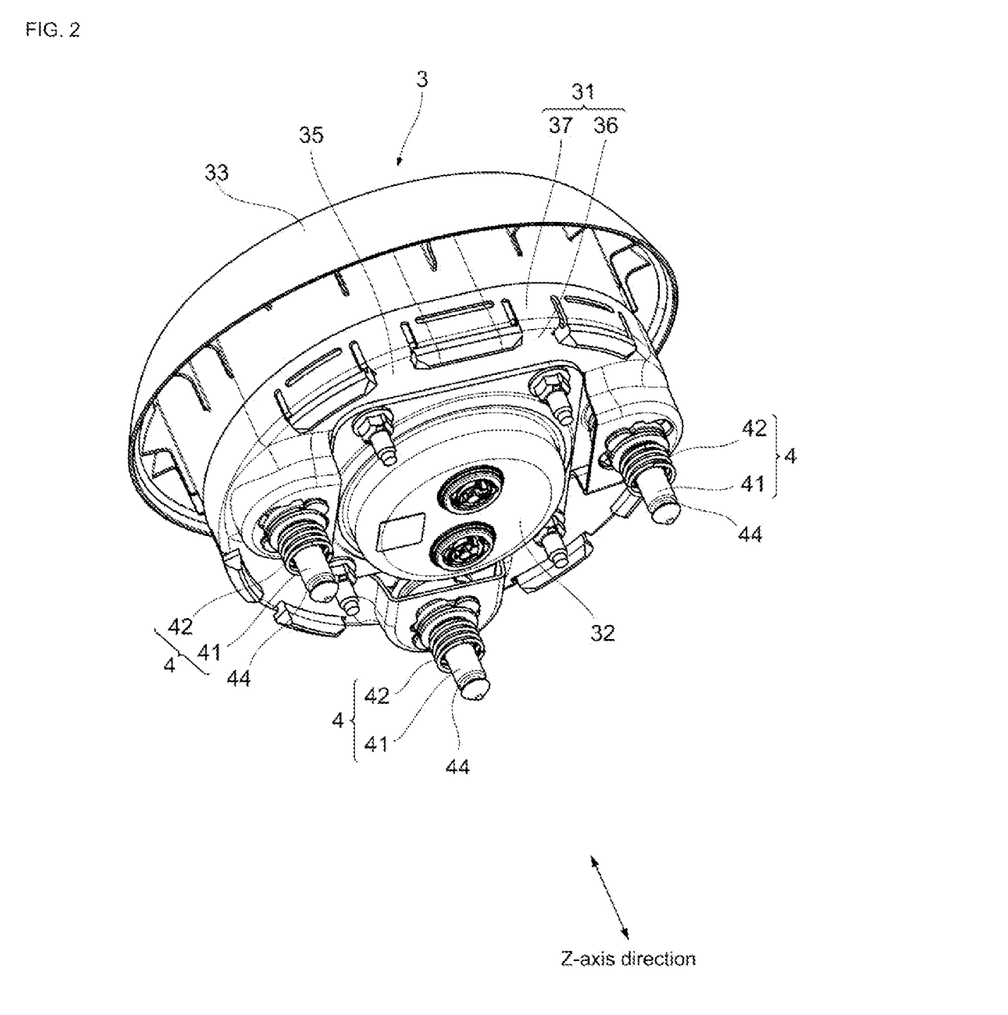
FIG. 2 is a perspective view depicting the airbag module of the steering wheel according to the embodiment.

As depicted in FIG. 2, the airbag module 3 includes a housing 31, in which an airbag cushion 30 (see FIG. 4) is stowed. The airbag cushion 30 is in, for example, a folded state in the housing 31. In addition, the airbag module 3 includes an inflator 32 supported in the housing 31 and a module cover 33 that covers the airbag cushion 30 and inflator 32 from the driver side.

A well known configuration can be adopted for the housing 31, inflator 32, and module cover 33. For example, the housing 31 has the inflator 32 mounted in the center of a bottom wall 36 with a bottom surface 35 in the XY plane and the module cover 33 mounted to a peripheral wall 37 rising from the bottom wall 36 with a fastener (not depicted). The inflator 32 has a low-profile hollow disc body with gas discharge holes. The module cover 33 can function as a horn switch pressed by the driver when sounding the horn. In the event of a vehicle emergency, the inflator 32 is activated upon receiving a signal from the vehicle sensors and immediately supplies gas to the airbag cushion 30. That is, the airbag is activated. The airbag cushion 30 supplied with gas rapidly expands, ruptures the module cover 33, expands toward the driver's side of the vehicle interior space, and restrains the driver.

In another embodiment, the airbag module 3 may have a locking plate 39 attached to the housing 31 (see FIG. 4, details described below). In the case of having a locking plate 39, the bottom part of the airbag module 3 facing the core metal 2 is primarily composed of the locking plate 39, and in the case of not having a locking plate 39, the bottom part of the airbag module is composed of the bottom wall 36 of the housing 31.

A plurality (three in this case) of support units 4, 4, 4 are arranged on the bottom part of the airbag module 3. The positions of the three support units 4 correspond to the positions of three mounting holes 24 of the core metal 2. For example, the three support units 4 are arranged in the directions of 3 o'clock, 6 o'clock and 9 o'clock based on an analog 12-hour clock when the airbag module 3 is viewed on a plane orthogonal to the Z-axis direction. The number and arranged locations of the support units 4 can be set as appropriate.

When the airbag module 3 is assembled to the core metal 2 (see FIG. 3), the support units 4 support the airbag module 3 so as to enable moving the airbag module 3 relative to the core metal 2 in the Z-axis direction. The support units 4 are provided between the core metal 2 and the airbag module 3 in association therewith. In addition, in the present Embodiment, the support units 4 are provided with a function as a dynamic damper for damping vibrations from the vehicle. In other words, the support units 4 are provided so as to couple the core metal 2 and the airbag module 3 and constitute a module damper that transmits core metal 2 vibration to the airbag module 3.

The support units 4 include a pin 41 and a spring 42. On the other hand, a collar 51 is inserted in the mounting hole 24 and a retaining spring 52 is provided near the collar 51 on the base part 21 of the core metal 2 (see FIG. 3). The retaining spring 52 is, for example, composed of a wire material such as metal so as to be elastically deformable. The retaining spring 52 is configured to enable engaging with a locking groove 44 of the pin 41, and is configured to enable mounting to the base part 21. Note that three retaining springs 52 corresponding to the number of pins 41 are provided; however, one retaining spring (for example, an Q-shaped or a M-shaped spring) may be used.

Figure 3:
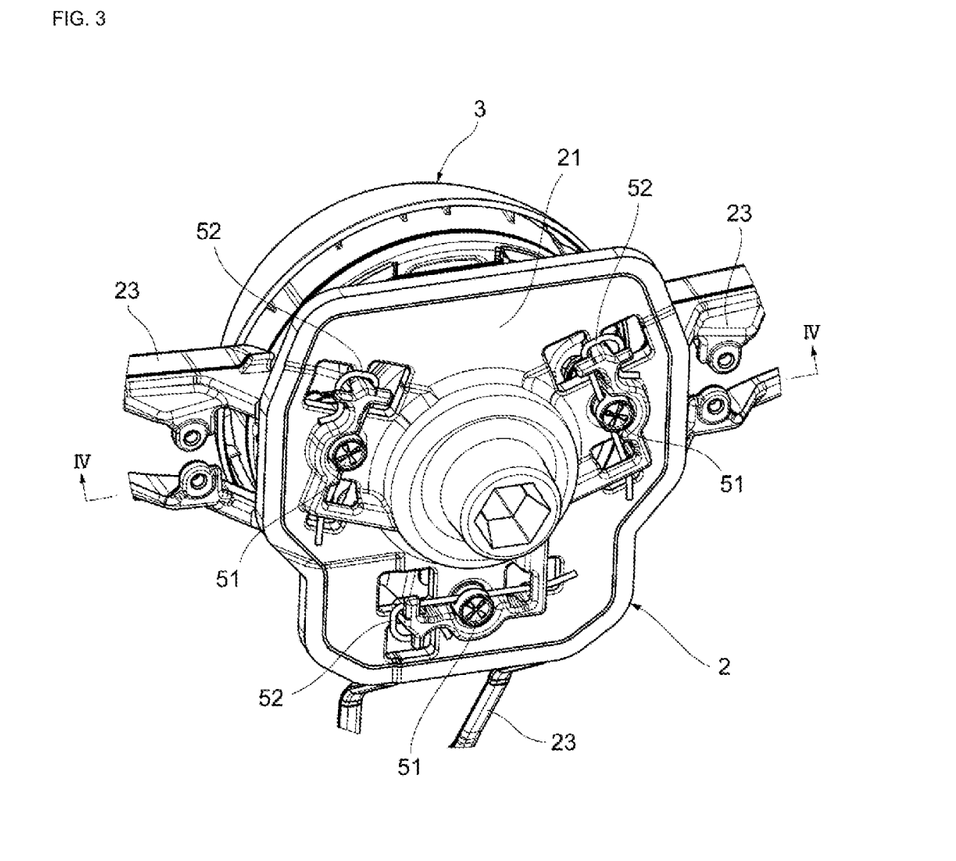
FIG. 3 is a perspective view depicting a state of the airbag module of FIG. 2 mounted to the core metal.

As depicted in FIG. 3, in the present Embodiment, the airbag module 3 is assembled to the core metal 2 via the support unit 4, the collar 51, and the retaining spring 52. Specifically, when assembling the airbag module 3 having the support unit 4 depicted in FIG. 2 to the core metal 2, the pin 41 of the support unit 4 is inserted into the collar 51 fitted in the mounting hole 24 (see FIG. 4). Furthermore, a part of the retaining spring 52 mounted on the base part 21 engages with the locking groove 44 of the pin 41 (see FIG. 4). This engagement couples the airbag module 3 to the core metal 2. In addition, in this state, the spring 42 is interposed between the bottom part of the airbag module 3 and the base part 21 of the core metal 2 and the airbag module 3 is elastically supported relative to the core metal 2.

Next, details for the support unit 4, the collar 51, a horn mechanism 7, and a stopper 8, will be described with reference to FIGS. 4 to 6.

Figure 4:
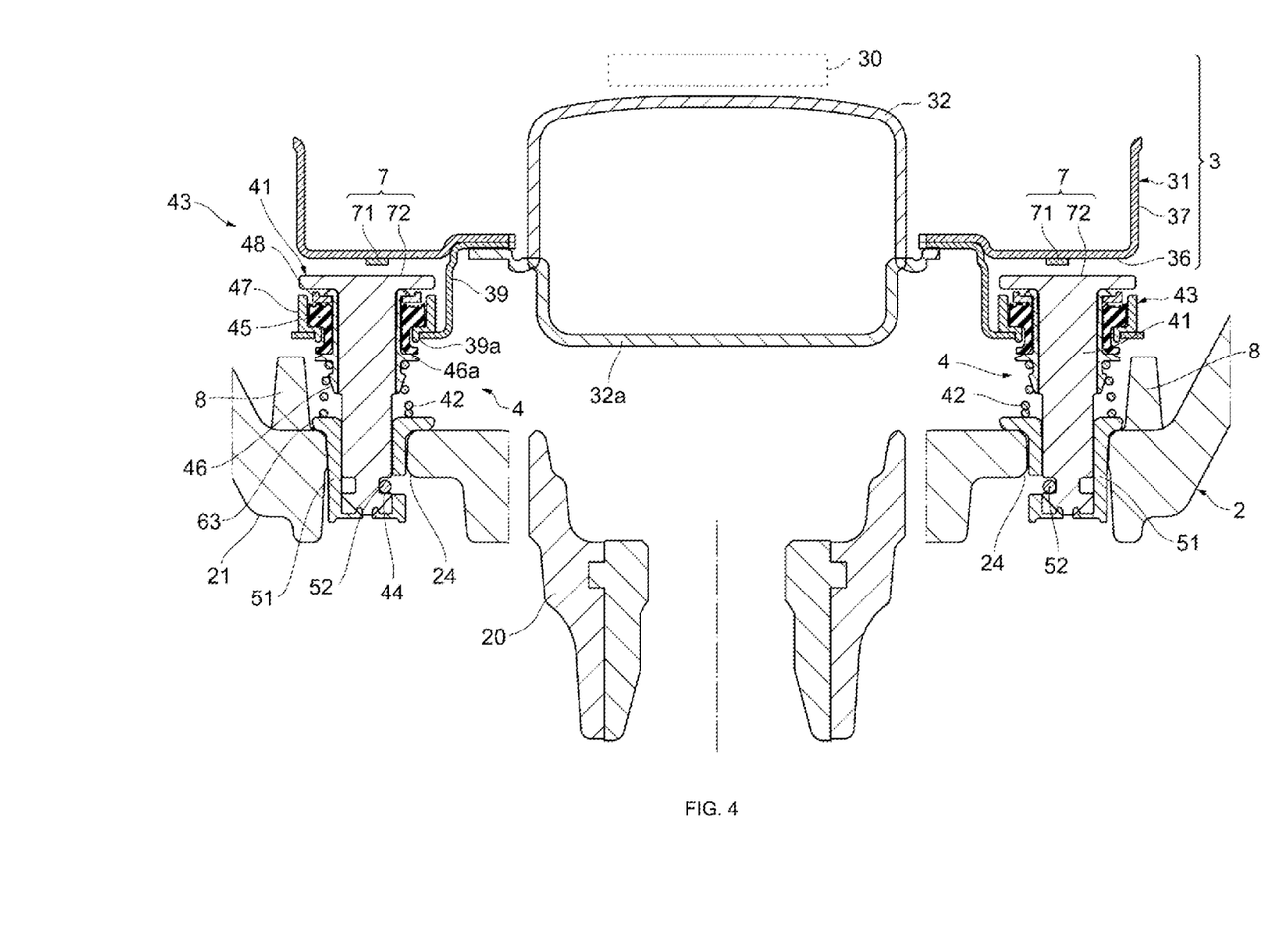
FIG. 4 is a cross section view of a cross section along line IV-IV in FIG. 3.

In this specific example, the airbag module 3 includes a locking plate 39, as depicted in FIG. 4. The locking plate 39 is associated with the support unit 4 and mounted to the bottom wall 36 of the housing 31. For example, the locking plate 39 is produced by press molding one sheet of a metal plate, separating the portion associated with the support unit 4 from the bottom wall 36 of the housing 31, and mounting the center part to the bottom wall 36. The locking plate 39 includes an opening part 39a in the portion separated from the bottom wall 36, and the pin 41 of the support unit 4 is slipped into this opening part 39a. In addition, a securing plate 32a for the inflator 32 is mounted at the portion where the bottom wall 36 of the housing 31 is mounted.

As depicted in FIG. 4, the support unit 4 includes a pin 41 and a spring 42, and further, includes a damper assembly 43 mounted to the opening part 39a.

The damper assembly 43 includes an elastic body 45, an inner sleeve 46 and outer sleeve 47 that retain the elastic body 45, and an annular piece 48 that covers the upper surface of the elastic body 45. The elastic body 45 is for suppressing steering wheel 1 vibration and is formed in an annular shape out of rubber, silicone, or the like. The inner sleeve 46, outer sleeve 47, and annular piece 48 are composed of, for example, resin, and the elastic body 45 is retained in the spaces surrounded by these.

The pin 41 is slipped into the inner sleeve 46. The inner sleeve 46 is configured to enable sliding in the Z-axis direction relative to the pin 41. The outer sleeve 47 is mounted to the opening part 39a. This manner of mounting secures the support unit 4 to the locking plate 39 (bottom part of airbag module 3). Therefore, when the airbag module 3 moves in the Z-axis direction, the damper assembly 43 also moves in the Z-axis direction together with the airbag module 3 and during this movement, the inner sleeve 46 of the damper assembly 43 moves relative to the pin 41.

The pin 41 extends in the Z-axis direction and is slipped into the opening part 39a inside the inner sleeve 46. The pin 41 has a fixed contact 72 of the horn mechanism 7 at a first end in the Z-axis direction (end facing the bottom wall 36 of the housing 31). Here, the pin 41 is formed out of a metal material that is electrically conductive and the entirety of the first end in the Z-axis direction constitutes the fixed contact 72. The pin 41 is electrically insulated from the locking plate 39 by the damper assembly 43. The first end of the pin 41 (fixed contact 72) is formed in a flange shape and the upper part of the damper assembly 43 (outer edge of inner sleeve 46 and upper end of annular piece 48 and outer sleeve 47) is positioned at the bottom of this flange part.

In addition, the pin 41 is provided so as to protrude from the bottom part of the airbag module 3 toward the core metal 2 side and the protruding tip end part (second end in Z-axis direction) is inserted into the collar 51 and slipped into the mounting hole 24. The locking groove 44 is formed at the tip end part of the pin 41 orthogonal to the axial direction of the pin 41 and the retaining spring 52 engages with this locking groove 44. As described above, the retaining spring 52 being mounted to the core metal 2, and the retaining spring 52 engaging with the locking groove 44, secures the pin 41 to the core metal 2.

The spring 42 is provided between the core metal 2 and the airbag module 3 and biases the airbag module 3 away from the core metal 2. Here, the spring 42 is provided between the collar 51 fitted in the mounting hole 24 of the core metal 2 and the damper assembly 43 mounted in the opening part 39a of the airbag module 3 and biases the airbag module 3 away from the core metal 2 by means of the damper assembly 43.

More specifically, the spring 42 is composed of a coil spring provided so as to wind around the periphery of the pin 41. Furthermore, a first end of the spring 42 in the Z-axis direction is retained on a retaining part 46a of the inner sleeve 46 and a second end thereof in the Z-axis direction is a free end (see FIG. 2). The second end of the spring 42 overlaps on a flange part 63 of the collar 51 when the airbag module 3 is assembled to the core metal 2. In this assembled state, the spring 42 allows the airbag module 3 to be displaced relative to the core metal 2 (notably, movable along the Z-axis direction).

Figure 5A:
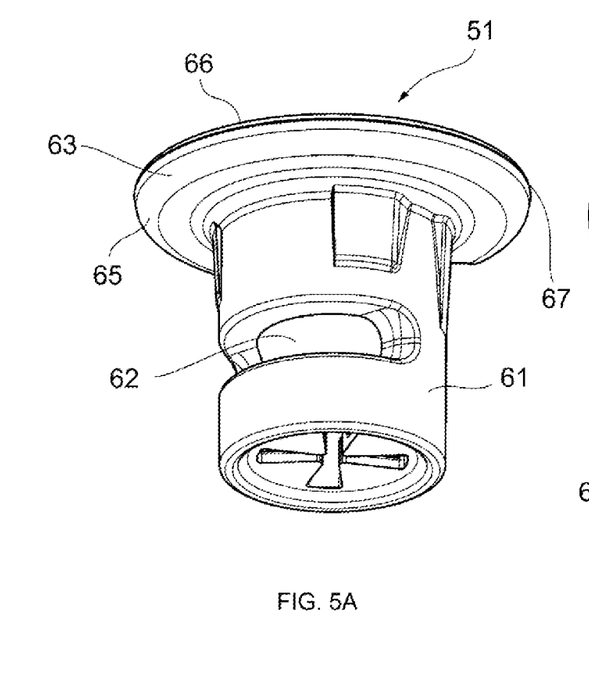
FIG. 5A is an upper perspective view of a collar used to mount the airbag module to the core metal.
Figure 5B:
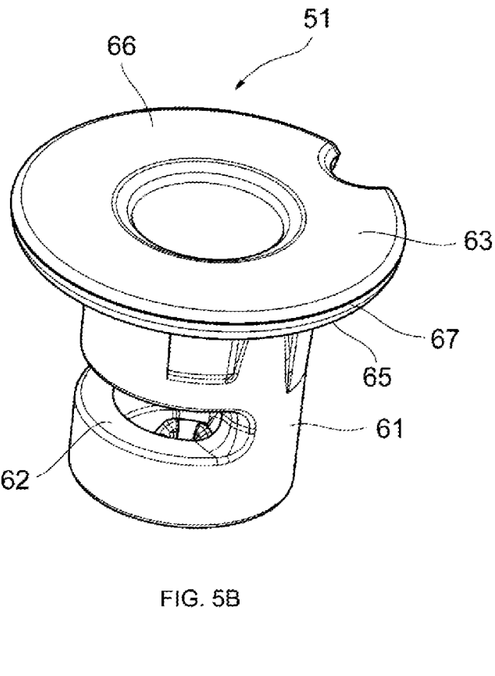
FIG. 5B is a lower perspective view of the collar of FIG. 5A.
Figure 6:
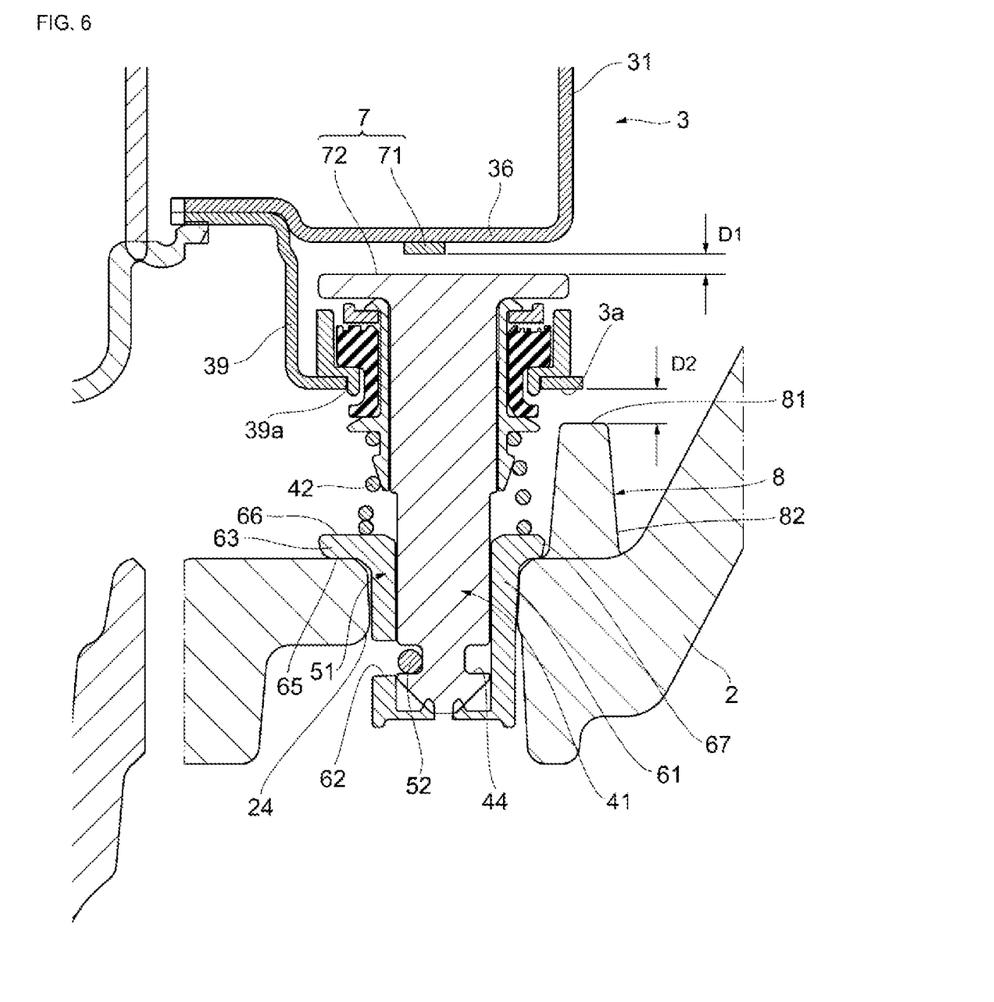
FIG. 6 is an enlarged view of FIG. 4 depicting the area around the support unit, horn mechanism, and the stopper.

As depicted in FIGS. 5 and 6, the collar 51 includes a tubular part 61, a notch part 62, and the flange part 63. The tubular part 61 is arranged in the mounting hole 24 and the pin 41 is inserted thereinside. The tubular part 61 is arranged inside the mounting hole 24 by means of, for example, press fitting. The notch part 62 is formed by notching the tubular part 61 in a direction orthogonal to the axial direction thereof to enable communication between the inside and outside of the tubular part 61. A part of the retaining spring 52 is positioned through the notch part 62 and in the tubular part 61, enabling engaging with the locking groove 44 of the pin 41. The flange part 63 is formed at a first end of the tubular part 61. The flange part 63 has a prescribed thickness and has a bottom surface 65, an upper surface 66, and a side surface 67 that connects these. The bottom surface 65 seats against the edge of the mounting hole 24 and the first end of the spring 42 is placed on the upper surface 66. A part of the stopper 8 faces the side surface 67 with a small gap therebetween.

The collar 51 having such a configuration is molded, for example, from synthetic resin. The collar 51 is advantageous in holding a relative position or interval between the pin 41 and the mounting hole 24. In the present Embodiment, a pin receiving part having the collar 51 and the mounting hole 24 is provided on the core metal 2 and the pin 41 is engaged with the retaining spring 52 in the pin receiving part. The form of the pin receiving part is not limited to this, and in another embodiment, the pin receiving part not having the collar 51 is also possible.

As depicted in FIG. 6, the horn mechanism 7 has a movable contact 71 and a fixed contact 72. The movable contact 71 is provided on the airbag module 3. Here, the movable contact 71 is arranged on the bottom wall 36 of the housing 31. The fixed contact 72 is provided on the core metal 2 or the support unit 4. Here, the fixed contact 72 is provided at one end of the pin 41 in the Z-axis direction. The movable contact 71 and the fixed contact 72 face each other in the Z-axis direction. In addition, the movable contact 71 and the fixed contact 72 are connected to a horn circuit (not depicted) that sounds a horn when energized.

The movable contact 71 and the fixed contact 72 are normally separated from each other, and the horn mechanism 7 is in a non-operating state. When the airbag module 3 (module cover 33) is pushed toward the metal core 2 in the Z-axis direction from this state, the airbag module 3 approaches the core metal 2 against the biasing force of the spring 42, and the movable contact 71 comes into contact with the fixed contact 72. This contact places the horn mechanism 7 into a horn operating state and causes the horn to sound. On the other hand, when pushing on the airbag module 3 is released, the airbag module 3 is returned to the original position thereof based on the bias force of the spring 42, and put in a horn non-operating state.

The stopper 8 is provided on the core metal 2. The stopper 8 is normally separate from the airbag module 3 and is provided so as to enable contact with the airbag module 3 if the airbag module 3 moves a prescribed amount or more in the Z-axis direction. The stopper 8 is formed on the base part 21 of the core metal 2 so as to protrude toward the airbag module 3. In addition, the stopper 8 is integrally formed with the core metal 2. For example, when the core metal 2 is formed by casting, the stopper 8 is formed together with other portions of the core metal 2.

The stopper 8 has a vertically long shape along the Z-axis direction, and has a flat surface 81 that intersects with (here, orthogonal to) the Z-axis direction at the top part that is in contact with the airbag module 3. Here, the entire surface of the top part is the flat surface 81. In addition, the flat surface 81 is parallel to and in contact with a receiving surface 3a of the airbag module 3. Here, a part of the bottom surface of the locking plate 39 serves as a receiving surface 3a, and the flat surface 81 of the stopper 8 can come into contact with the receiving surface 3a of the locking plate 39.

Figure 7A:
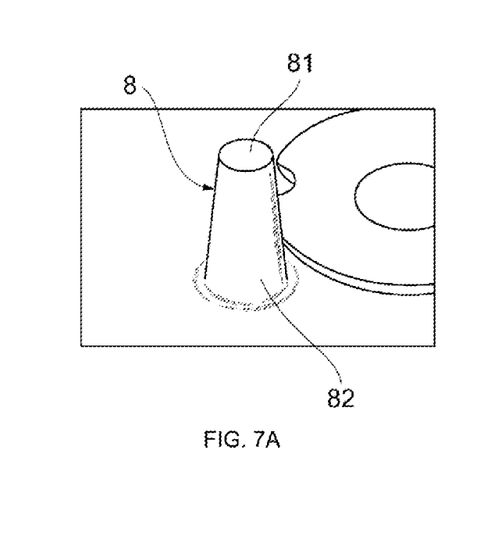
FIG. 7A is a perspective view of a stopper formed in a truncated cone shape.
Figure 7B:
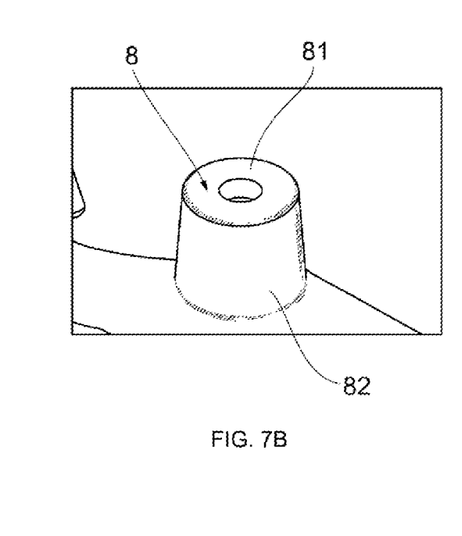
FIG. 7B is a perspective view of a stopper formed in the shape of a donut-shaped truncated cone.
Figure 7C:
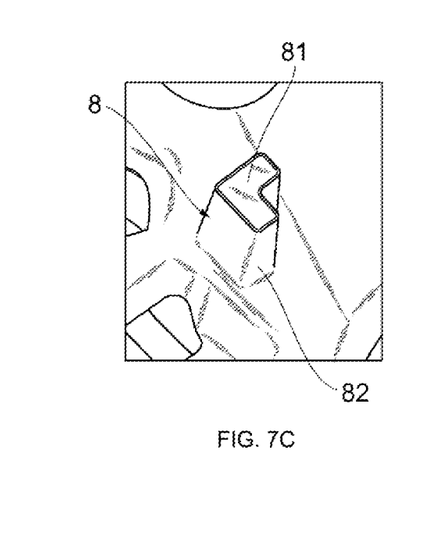
FIG. 7C is a perspective view of a stopped that is L-shaped in plan view and which widens from the top part to the root part.

The stopper 8 is formed so as to widen from the top part to a root part 82 on the opposite side. For example, the stopper 8 is a conical shape or a truncated cone shape. More specifically, the stopper 8 is formed in a truncated cone shape as depicted in FIG. 7A. In another embodiment, as depicted in FIG. 7B, the stopper 8 may be formed in the shape of a donut-shaped truncated cone with a cavity in the center part. Alternatively, as depicted in FIG. 7C, the stopper 8 may be L-shaped in plan view and widen from the top part to the root part 82.

The stopper 8 is provided near the support unit 4. In the present Embodiment, there are three stoppers 8 corresponding to the three support units 4, and each stopper 8 is provided near the corresponding support unit 4. Specifically, the stopper 8 is positioned near the spring 42 of the support unit 4. Most of the stopper 8 faces the spring 42 with a gap therebetween. In addition, (a part of) the root part 82 of the stopper 8 faces the side surface 67 of the flange part 63 of the collar 51 with a slight gap therebetween. This slight gap is, for example, about 1 mm.

In another embodiment, a plurality of stoppers 8 can be provided in the vicinity of one support unit 4. For example, two stoppers 8 can be provided so as to face each other with the spring 42 interposed therebetween. However, considering the space for providing the stopper 8, it is preferable that one stopper 8 is provided for one support unit 4. In addition, one or more stoppers 8 can be provided at a position separated from the support unit 4 instead of near the support unit 4. However, in light of the effect of the stopper 8 (distribution of load described below) of restricting movement of the airbag module 3 beyond a prescribed amount, the stopper 8 is preferably provided near the support unit 4.

Here, the distance relationship in the Z-axis direction will be described. With the horn non-operating state, the movable contact 71 of the horn mechanism 7 is separated from the fixed contact 72 by a first distance D1 (distance between contacts) in the Z-axis direction. On the other hand, the stopper 8 is separated from the airbag module 3 by a second distance D2 in the Z-axis direction when in the horn non-operating state. Here, the second distance D2 means the distance between the flat surface 81 of the stopper 8 and the receiving surface 3a of the airbag module 3. Furthermore, the second distance D2 is farther than the first distance D1. For example, the first distance D1 is set to around 1.5 mm while the second distance D2 is set to around 3 mm.

The steering wheel 1 is normally in a horn non-operating state. Even when in the horn operating state (airbag in non-operating state), the stopper 8 is separated from the airbag module 3 in the Z-axis direction. In other words, when the driver normally applies a pressing force to the module cover 33 of the airbag module 3 in order to sound the horn, the airbag module 3 is pushed down and the movable contact 71 and the fixed contact 72 come into contact with each other, while the stopper 8 and the airbag module 3 remain separated. At this time, the distance between the stopper 8 and the airbag module 3 is obtained by subtracting the first distance D1 from the second distance D2.

On the other hand, when the airbag is activated, the distance between the stopper 8 and the airbag module 3 disappears, and the airbag module 3 comes into contact with the stopper 8. This is because when the airbag is activated, a pressing force (load) larger than the pressing force applied when the horn is normally activated is applied to the airbag module 3, and the airbag module 3 further moves toward the core metal 2. More specifically, when the airbag is activated, the airbag cushion 30 expands and deploys with the bottom wall 36 of the housing 31 as a reaction force surface, and the force at that time acts in the direction of strongly pushing down the airbag module 3. As a result, the airbag module 3 moves further downward in the Z-axis direction than the distance between the contacts (first distance D1) and comes into contact with the stopper 8. This contact restricts further downward movement of the airbag module 3.

The effects of the present Embodiment described above will be described.

The steering wheel 1 according to the embodiment includes:
a core metal 2 forming a skeletal structure of the steering wheel 1;
an airbag module 3 having a housing 31 in which an airbag cushion 30 is stowed;
a support unit 4 that supports the airbag module 3 enabling the airbag module 3 to move along the Z-axis direction relative to the core metal 2;
a horn mechanism 7 having the movable contact 71 provided on the airbag module 3 and the fixed contact 72 provided on the pin 41 of the support unit 4;
and
a stopper 8 provided on the core metal 2 so as to enable coming into contact with the airbag module 3. The movable contact 71 is separated from the fixed contact 72 by a first distance D1 in the Z-axis direction when in the horn non-operating state, while to achieve the horn operating state, the airbag module 3 is moved in the Z-axis direction and comes into contact with the fixed contact 72. The stopper 8 is separated from the airbag module 3 by a second distance D2 in the Z-axis direction when in the horn non-operating state. Furthermore, the second distance D2 is farther than the first distance D1.

According to this aspect, in the case where the airbag module 3 moves toward the core metal 2 the second distance D2, exceeding the distance between the contacts (the first distance D1) when the airbag is activated, this movement is restricted by the stopper 8. As a result, the airbag module 3 is supported by the core metal 2 via not only the support unit 4 but also the stopper 8. Therefore, the supported load is distributed when the airbag is activated.

This load distribution can prevent damage or deformation of the support unit 4 and the parts associated therewith. For example, not only the spring 42 of the support unit 4, but also the collar 51 and the inner sleeve 46 with which the springs 42 come into contact, enables preventing damage and deformation of the locking plate 39 to which the damper assembly 43 is attached. As a result, the airbag module 3 is appropriately supported, so that the prescribed deployment performance of the airbag cushion 30 can be ensured.

In addition, since the distance relationship in the horn non-operating state is set to the above relationship (D2>D1), during the transition from the horn non-operating state to the horn operating state (the airbag module 3 is moved by the first distance D1 during movement in the Z-axis direction), the movement of the airbag module 3 is not restricted by the stopper 8. Although the stopper 8 is provided to support the airbag module 3 when the airbag is activated, the stopper does not affect the horn function.

In addition, according to the embodiment, the stopper 8 has a vertically long shape along the Z-axis direction, and has a flat surface 81 that intersects with the Z-axis direction at the top part that is in contact with the airbag module 3. As a result, contact of the stopper 8 with the airbag module 3 can be surface contact, so that damage to the airbag module 3 can be suppressed. In addition, the manufacturability of the stopper 8 itself can also be improved.

Also, according to the embodiment, the airbag module 3 includes a receiving surface 3a at a second distance D2 from the flat surface 81 of the stopper 8, the flat surface 81 and the receiving surface 3a being parallel. Thus, surface contact can be enhanced, and support by the stopper 8 is stabilized.

In addition, with the embodiment, the stopper 8 is formed so as to widen from the top part to a root part 82 on the opposite side. Thereby, the strength of the stopper 8 itself can be increased. In addition, the manufacturability of the stopper 8 itself can also be improved. For example, when the stopper 8 is manufactured together with the core metal 2 by casting, the fluidity of the casting metal can be ensured.

Further, according to the embodiment, the stopper 8 is formed on the core metal 2 so as to be able to come into contact with the airbag module 3. Thereby, the core metal 2 can be used effectively and the stopper 8 can be provided. In addition, since the stopper 8 can be manufactured together with the core metal 2 by casting, for example, the manufacturability of the stopper 8 itself can be improved.

The embodiment described above is for ease of understanding of the present invention and is not intended to be construed as limiting the present invention. Elements included in the embodiment, as well as arrangements, materials, conditions, shapes, sizes, and the like thereof, are not limited to those exemplified, but rather can be appropriately changed.

Figure 8:
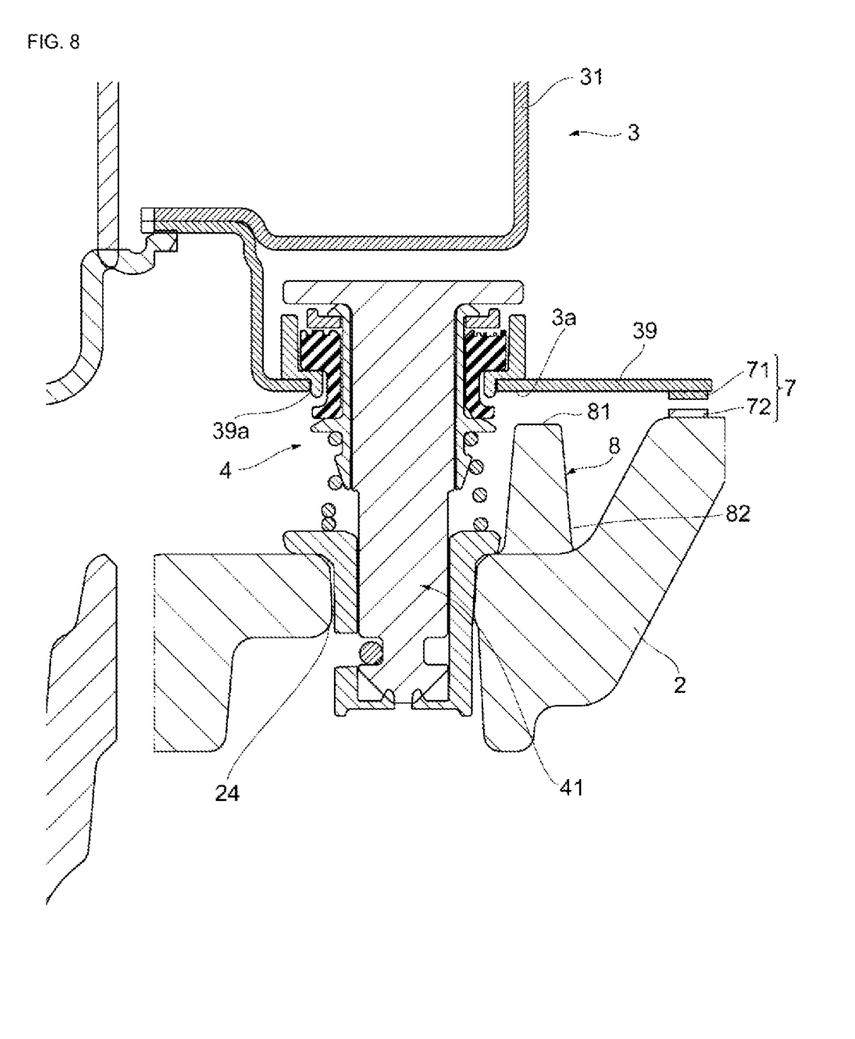
FIG. 8 is a cross section view similar to FIG. 6 of a steering wheel according to another embodiment.

For example, the arrangement of the movable contact 71 and fixed contact 72 of the horn mechanism 7 can be changed. For example, as depicted in FIG. 8, the movable contact 71 may be provided on the locking plate 39 of the airbag module 3 instead of on the housing 31 of the airbag module 3. In addition, the fixed contact 72 may be provided on the core metal 2 instead of on the pin 41 of the support unit 4. Other than that, the basic configuration is the same as that of the embodiment described above.

Figure 9:
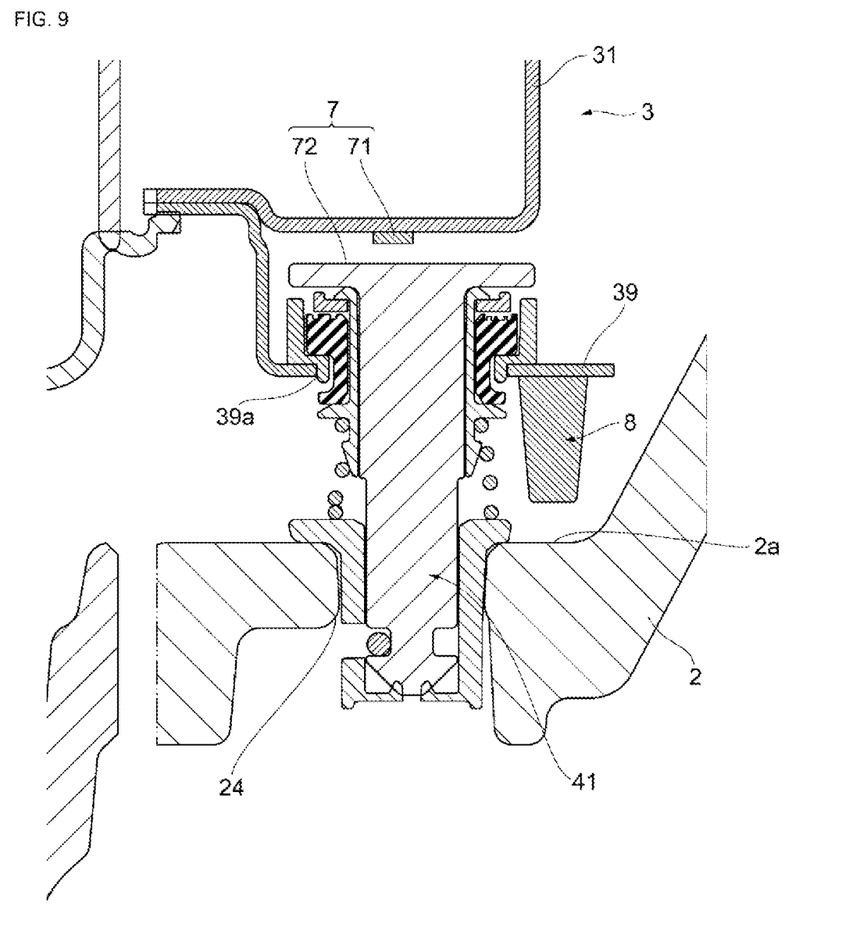
FIG. 9 is a cross section view similar to FIG. 6 of a steering wheel according to still another embodiment.

Also, the position of the stopper 8 can be changed. For example, as depicted in FIG. 9, the stopper 8 may be provided on the airbag module 3 instead of the core metal 2. Here, the stopper 8 is formed on the locking plate 39. The stopper 8 protrudes toward the core metal 2 and comes into contact with the receiving surface 2a of the core metal 2 when the airbag is activated. The receiving surface 2a is parallel to the flat surface 81 of the stopper 8. The basic configuration, such as that the stopper 8 is provided in the vicinity of the support unit 4, is common with the embodiment described above.

Figure 10:
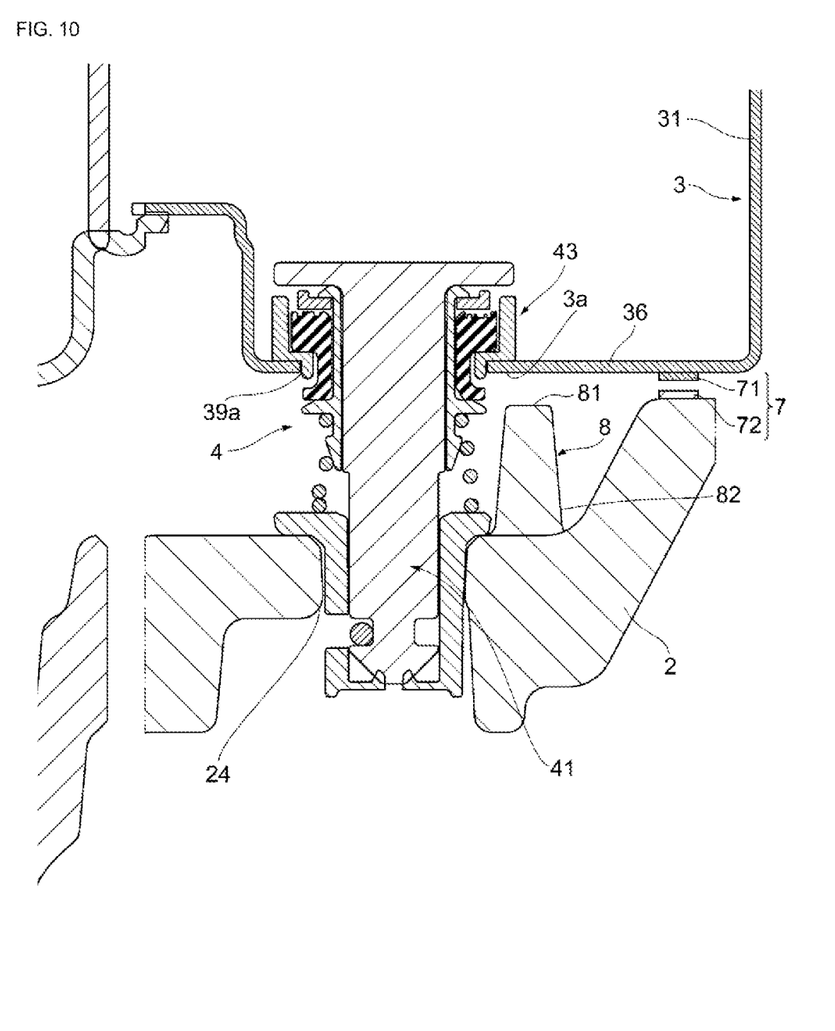
FIG. 10 is a cross section view similar to FIG. 6 of a steering wheel according to still another embodiment.

In addition, as described above, the airbag module 3 may not have the locking plate 39. In this case, for example, as depicted in FIG. 10, the bottom portion of the airbag module 3 facing the core metal 2 is mainly constituted by the bottom wall 36 of the housing 31. The bottom wall 36 has a receiving surface 3a that comes into contact with the stopper 8 when the airbag is activated. In addition, the bottom wall 36 is formed with an opening part 39a for mounting the damper assembly 43 thereon. Note that, in the example depicted in FIG. 10, the fixed contact 72 is provided on the core metal 2, but other basic configurations are common with the embodiment described above.

Moreover, a member (cushioning material) for absorbing shock is provided at a portion (for example, the receiving surface 3a of the airbag module 3 or the receiving surface 2a of the core metal 2) in contact with the stopper 8, or surface treatment for absorbing the shock is provided.

EXPLANATION OF CODES

1. Steering wheel; 2. Core metal; 2a. Receiving surface; 3. Airbag module; 3a. Receiving surface; 4. Support unit; 7. Horn mechanism; 8. Stopper; 20. Boss part; 21. Base part; 22. Rim part; 23. Spoke part; 24. Mounting hole; 30. Airbag cushion; 31. Housing; 32. Inflator; 32a. Securing plate; 33. Module cover; 35. Bottom surface; 36. Bottom wall; 37. Peripheral wall; 39. Lock Plate; 39a. Opening part; 41. Pin; 42. Spring; 43. Damper assembly; 44. Locking groove; 45. Elastic body; 46. Inner sleeve; 46a. Retaining part; 47. Outer sleeve; 48. Annular piece; 51. Collar; 52. Retaining spring; 61. Tubular part; 62. Notched part; 63. Flange part; 65. Bottom surface; 66. Upper surface; 67. Side surface; 68. Side surface; 71. Movable contact; 72. Fixed contact; 81. Flat surface; 82. Root part; D1. First distance; and D2. Second distance.

The invention claimed is:

1. A steering wheel, comprising:
    a core metal forming a skeletal structure of the steering wheel;
    an airbag module including a housing for stowing an airbag cushion;
    a support unit for supporting the airbag module enabling the airbag module to move along a first direction relative to the core metal, the support unit including:
        a spring provided between the core metal and the airbag module providing bias for separating the airbag module from the core metal;
        a damper assembly having an elastic body mounted on an opening part formed on the airbag module; and
        a pin that engages with a pin receiving part provided on the core metal, extends in the first direction, and is inserted into the opening part, wherein the damper assembly is configured to enable movement along the first direction relative to the pin and moves in the first direction together with the airbag module;
    a horn mechanism including a movable contact and a fixed contact, the movable contact being provided on the airbag module, the fixed contact being provided on the core metal or the support unit, the movable contact being separated from the fixed contact by a first distance in a first direction when in a horn non-operating state, while the movable contact comes into contact with the fixed contact for a horn operating state by the airbag module moving in the first direction; and a stopper provided on a second of the core metal and the airbag module so as to enable coming into contact with a first of the core metal and the airbag module, and when in a horn non-operating state, is at a second distance in the first direction relative to the first of the core metal and the airbag module, wherein the second distance is a longer distance than the first distance.

2. The steering wheel according to claim 1, wherein the stopper has an elongated shape in the first direction and has a flat surface that intersects with the first direction on a top part of the stopper in contact with the first of the core metal and the airbag module.

3. The steering wheel according to claim 2, wherein the first of the core metal and the airbag module includes a receiving surface at the second distance from the flat surface of the stopper and the flat surface and the receiving surface are parallel.

4. The steering wheel according to claim 2, wherein the stopper is formed spreading from the top part to a root part on the opposite side.

5. The steering wheel according to claim 1, wherein the stopper is provided near the support unit.

6. The steering wheel according to claim 5, wherein there are a plurality of the support units and the stoppers and the plurality of stoppers are respectively provided in the vicinity of the plurality of support units.

7. The steering wheel according to claim 1, wherein the support unit is provided so as to couple the core metal and the airbag module and wherein the elastic body transmits vibration of the core metal to the airbag module.

8. The steering wheel according to claim 1, wherein the spring is provided so as to wrap around the outer circumference of the pin and the stopper is positioned on the outside of the spring close to the spring.

9. The steering wheel according to claim 8, wherein the pin receiving part includes:
a mounting hole formed in the core metal; and
a collar having a tubular part arranged in the mounting hole and into which the pin is inserted and a flange part formed at a first end of the tubular part;
the flange part includes a bottom surface that seats at the edge of the mounting hole, an upper surface on the opposite side of the bottom surface and on which a first end of the spring is placed, and a side surface that connects the bottom surface and the upper surface of the flange part; and
a part of the stopper faces the side surface of the flange part with a slight gap therebetween.

10. The steering wheel according to claim 1, wherein the pin includes the fixed contact at a first end in the first direction.

11. The steering wheel according to claim 1, wherein the stopper is formed on the core metal so as to enable contact with the airbag module.

12. The steering wheel according to claim 11, wherein the stopper protrudes toward the airbag module.

13. The steering wheel according to claim 11, wherein the stopper is configured so as to enable contact with a housing bottom wall.

14. The steering wheel according to claim 11, wherein the airbag module has a lock plate associated with the support unit and mounted on a bottom wall of the housing and the stopper is configured so as to enable contact with the lock plate.

15. A steering wheel, comprising:
a core metal forming a skeletal structure of the steering wheel;
an airbag module including a housing for stowing an airbag cushion;
a support unit for supporting the airbag module enabling the airbag module to move along a first direction relative to the core metal;
a horn mechanism including a movable contact and a fixed contact, the movable contact being provided on the airbag module, the fixed contact being provided on the core metal or the support unit, the movable contact being separated from the fixed contact by a first distance in a first direction when in a horn non-operating state, while the movable contact comes into contact with the fixed contact for a horn operating state by the airbag module moving in the first direction; and
a stopper provided on a second of the core metal and the airbag module so as to enable coming into contact with a first of the core metal and the airbag module, and when in a horn non-operating state, is at a second distance in the first direction relative to the first of the core metal and the airbag module, wherein the airbag module has a lock plate associated with the support unit and mounted on a bottom wall of the housing, wherein the stopper is formed on the core metal so as to enable contact with the lock plate, and wherein the second distance is a longer distance than the first distance.

16. The steering wheel according to claim 15, wherein the stopper has an elongated shape in the first direction and has a flat surface that intersects with the first direction on a top part of the stopper in contact with the first of the core metal and the airbag module.

17. The steering wheel according to claim 16, wherein the first of the core metal and the airbag module includes a receiving surface at the second distance from the flat surface of the stopper and the flat surface and the receiving surface are parallel.

18. The steering wheel according to claim 16, wherein the stopper is formed spreading from the top part to a root part on the opposite side.

19. The steering wheel according to claim 15, wherein the support unit is provided so as to couple the core metal and the airbag module, and wherein the support unit includes a module damper that transmits vibration of the core metal to the airbag module.

20. The steering wheel according to claim 15, wherein the support unit includes:
a damper assembly having an elastic body mounted on an opening part formed on the airbag module; and
a pin that engages with a pin receiving part provided on the core metal, extends in the first direction, and is inserted into the opening part, wherein the damper assembly is configured to enable movement along the first direction relative to the pin and moves in the first direction together with the airbag module.

* * * * *